(12) United States Patent
Fukui et al.

(10) Patent No.: US 8,505,848 B2
(45) Date of Patent: Aug. 13, 2013

(54) AIRCRAFT ACTUATOR HYDRAULIC SYSTEM

(75) Inventors: Atsushi Fukui, Gifu (JP); Norimasa Takagi, Sammamish, WA (US)

(73) Assignee: Nabtesco Corporation (JP)

( * ) Notice: Subject to any disclaimer, the term of this patent is extended or adjusted under 35 U.S.C. 154(b) by 3 days.

(21) Appl. No.: 13/277,812

(22) Filed: Oct. 20, 2011

(65) Prior Publication Data

US 2012/0131912 A1 May 31, 2012

Related U.S. Application Data

(60) Provisional application No. 61/417,706, filed on Nov. 29, 2010.

(51) Int. Cl.
*B64C 5/10* (2006.01)
(52) U.S. Cl.
USPC ........... 244/99.6; 244/99.4; 244/99.2; 60/405
(58) Field of Classification Search
USPC ....... 244/99.6, 99.5, 99.2, 99.4, 213; 60/405, 60/592
See application file for complete search history.

(56) References Cited

U.S. PATENT DOCUMENTS

| | | | | |
|---|---|---|---|---|
| 3,347,495 | A * | 10/1967 | Eberhardt et al. | 244/207 |
| 7,600,715 | B2 * | 10/2009 | Matsui | 244/99.6 |
| 7,870,726 | B2 * | 1/2011 | Matsui | 60/405 |
| 8,191,824 | B2 * | 6/2012 | Shaheen et al. | 244/76 A |
| 2003/0226467 | A1 * | 12/2003 | Nardone et al. | 102/489 |
| 2005/0109876 | A1 * | 5/2005 | Jones | 244/75 R |
| 2005/0129531 | A1 * | 6/2005 | Fenny et al. | 417/269 |
| 2006/0196633 | A1 * | 9/2006 | Mahjoub | 165/41 |
| 2006/0226285 | A1 * | 10/2006 | Matsui | 244/99.6 |
| 2009/0266934 | A1 * | 10/2009 | Makino | 244/99.5 |
| 2009/0272110 | A1 * | 11/2009 | Matsui | 60/451 |
| 2009/0308983 | A1 * | 12/2009 | Jones | 244/227 |
| 2012/0001021 | A1 * | 1/2012 | Fukui | 244/99.6 |
| 2012/0029859 | A1 * | 2/2012 | Fukui et al. | 702/114 |
| 2012/0032026 | A1 * | 2/2012 | Becker et al. | 244/118.5 |
| 2012/0045613 | A1 * | 2/2012 | Sanderson | 428/137 |
| 2012/0085860 | A1 * | 4/2012 | Nakagawa et al. | 244/99.4 |
| 2012/0131912 | A1 * | 5/2012 | Fukui et al. | 60/405 |

FOREIGN PATENT DOCUMENTS

| | | |
|---|---|---|
| JP | 2003-040199 A | 2/2003 |
| JP | 2007-046790 A | 2/2007 |

* cited by examiner

*Primary Examiner* — Timothy D Collins
*Assistant Examiner* — Medhat Badawi
(74) *Attorney, Agent, or Firm* — Studebaker & Brackett PC

(57) ABSTRACT

A first actuator drives a control surface by being operated by supply of pressure oil from a first aircraft central hydraulic power source including a first aircraft central hydraulic pump. A second actuator drives the control surface by being operated by supply of pressure oil from a second aircraft central hydraulic power source including a second aircraft central hydraulic pump. A backup hydraulic pump is installed inside a wing of the aircraft and is provided so as to be able to supply pressure oil to the first actuator when a loss or degradation in a function of at least one of the first aircraft central hydraulic power source and the second aircraft central hydraulic power source occurs. A maximum discharge pressure of the backup hydraulic pump is set to be greater than maximum discharge pressures of the first aircraft central hydraulic pump and the second aircraft central hydraulic pump.

2 Claims, 3 Drawing Sheets

AIRCRAFT ACTUATOR HYDRAULIC SYSTEM

BACKGROUND OF THE INVENTION

1. Field of the Invention

The present invention relates to an aircraft actuator hydraulic system that includes hydraulically operated actuators for driving a control surface of an aircraft and that supplies pressure oil to the actuators.

2. Description of Related Art

An aircraft is provided with control surfaces that are formed as moving surfaces (flight control surfaces) and are configured as an aileron, an elevator, a rudder, and the like. Hydraulically operated actuators are often used as actuators for driving such control surfaces. Note that, as disclosed in JP 2003-040199A, in an aircraft, for example, two hydraulically operated actuators are attached to one control surface and the control surface is driven by these two actuators.

Pressure oil is supplied to an actuator such as the above from an aircraft central hydraulic power source. Also, pressure oil is supplied to two actuators from separate aircraft central hydraulic power sources serving as separate systems. Accordingly, even if a loss or degradation in the function (pressure oil supply function) of one of the aircraft central hydraulic power sources occurs, it is possible to drive the control surface by one of the two actuators, thus ensuring high reliability.

The hydraulic system disclosed in JP 2007-046790A is known as a hydraulic system (aircraft actuator hydraulic system) that can ensure even higher reliability at the occurrence of a loss or degradation in the function of an aircraft central hydraulic power source. The hydraulic system disclosed in JP 2007-046790A includes a pump provided independently of the aircraft central hydraulic power sources, and is configured as a hydraulic system capable of supplying pressure oil to actuators when a loss or degradation in the function of an aircraft central hydraulic power source occurs. The pump of this hydraulic system is provided so as to be able to raise the pressure of the pressure oil discharged from the actuators and supply the pressure oil to the actuators. Also, this pump is configured to be operated when an aircraft central hydraulic power source undergoes a loss or degradation in its function due to a pressure decrease.

As described above, for an aircraft, it is necessary that a control surface can be driven by any of a plurality of actuators in order to ensure reliability at the occurrence of a loss or degradation in the function of an aircraft central hydraulic power source. For this reason, being able to secure an output that allows each actuator to drive a control surface on its own is a major factor in determining the size of the structure of the actuators. Therefore, there are severe constraints on reducing the size of the actuators.

Meanwhile, recently, there is a demand for coping with thinned wings, i.e., the reduction of the wing thickness, for the purpose of improving the efficiency of the aircraft body to increase the fuel efficiency, and, in the case where an actuator is installed inside a thinned wing, it is very important to reduce the size of the actuator. Note that, in the case where the actuator cannot be reduced in size and thus cannot be installed inside a thinned wing, the actuator will be installed on the outside of the wing. In this case, even if a fairing for covering the surface of the actuator is provided for reducing the aerodynamic drag, it is difficult to sufficiently reduce the aerodynamic drag, resulting in a reduced efficiency of the aircraft body.

As the method for reducing the size of a high-output actuator so as to allow the actuator to be installed inside a thinned wing, it is conceivable to adapt the aircraft central hydraulic power sources to high pressure. This allows for a high output for an actuator even if it has a small pressure receiving area, and therefore the size of the actuator can be reduced. In this case, however, it is necessary to adapt the entire hydraulic system, from the aircraft central hydraulic power sources to the actuators, to high pressure. This leads to a significant cost increase due to, for example, the fact that a special material that can be adapted to high pressure needs to be used for the entire hydraulic system.

SUMMARY OF THE INVENTION

In view of the foregoing circumstances, it is an object of the present invention to provide an aircraft actuator hydraulic system that includes a plurality of actuators for driving the same control surface, in which the control surface can be driven by a single actuator even in the case of a loss or degradation in the function of an aircraft central hydraulic power source, a size reduction can be realized for a high-output actuator at a low cost, and the actuators can be installed inside a thinned wing.

According to a first feature of an aircraft actuator hydraulic system according to the present invention for achieving the above-described object, an aircraft actuator hydraulic system includes hydraulically operated actuators for driving a control surface of an aircraft and that supplies pressure oil to the actuators, the system including: a first actuator that is provided as one of the actuators and that drives the control surface by being operated by supply of pressure oil from a first aircraft central hydraulic power source including a first aircraft central hydraulic pump; a second actuator that is provided as another one of the actuators and that drives the control surface by being operated by supply of pressure oil from a second aircraft central hydraulic power source including a second aircraft central hydraulic pump; and a backup hydraulic pump that is installed inside a wing of the aircraft and that can supply pressure oil to the first actuator when a loss or degradation in a function of at least one of the first aircraft central hydraulic power source and the second aircraft central hydraulic power source occurs, wherein a maximum discharge pressure of the backup hydraulic pump is set to be greater than maximum discharge pressures of the first aircraft central hydraulic pump and the second aircraft central hydraulic pump.

With this configuration, the aircraft actuator hydraulic system is provided as a hydraulic system including a plurality of actuators, namely, first and second actuators for driving the same control surface. Also, with this hydraulic system, even if a loss or degradation occurs in the function of the first and second aircraft central hydraulic power sources, the control surface can be driven by a single actuator, namely, the first actuator to which the pressure oil is supplied from the backup hydraulic pump installed inside the wing and therefore it is possible to ensure high reliability.

Further, the backup hydraulic pump is set such that its maximum discharge pressure is greater than the maximum discharge pressures of the first aircraft central hydraulic pump and the second aircraft central hydraulic pump. Accordingly, the backup hydraulic pump, rather than the first and second aircraft central hydraulic pumps, can be adapted to high pressure, thus making it possible to achieve a high output in the first actuator even with a small pressure receiving area. Accordingly, it is possible to reduce the size of the high-output first actuator. Note that the first actuator is configured such that the control surface can be driven by a single actuator, namely, the actuator with the pressure oil supplied from the backup hydraulic pump. Therefore, the second actuator does not need to be adapted to a high output in the same manner as the first actuator, and therefore its size can be reduced. Further, since the backup hydraulic pump installed inside the wing can be adapted to high pressure without adapting the first and second aircraft central hydraulic pumps to high pressure, it is not necessary to adapt the entire hydraulic system from the aircraft central hydraulic power sources to the actuators to high pressure. Accordingly, it is possible to realize a size reduction for the high-output first actuator at a low cost. Further, since it is possible to realize a size reduction for the high-output first actuator and a size reduction for the second actuator, it is possible to install the first and second actuators inside the wing having a reduced thickness.

Therefore, with this configuration, in an aircraft actuator hydraulic system including a plurality of actuators for driving the same control surface, the control surface can be driven by a single actuator, even in the case of a loss or degradation in the function of the aircraft central hydraulic power sources, and it is possible to realize a size reduction for the high-output actuator at a low cost and install the actuators inside the wing having a reduced thickness.

According to second feature of the aircraft actuator hydraulic system of the present invention, the aircraft actuator hydraulic system including the first feature further includes a controller that controls the backup hydraulic pump such that the backup hydraulic pump is operated when a loss or degradation in a function of at least one of the first aircraft central hydraulic power source and the second aircraft central hydraulic power source occurs, wherein, during a normal operation in which a loss or degradation in a function of the first aircraft central hydraulic power source or the second aircraft central hydraulic power source has not occurred, the controller controls the backup hydraulic pump such that the backup hydraulic pump is also operated if a high output condition is met, the condition being that a moment required to drive the control surface is greater than predetermined drive moments that can be generated by the first actuator operated with the pressure oil from the first aircraft central hydraulic power source and the second actuator operated with the pressure oil from the second aircraft central hydraulic power source.

With this configuration, the backup hydraulic pump is controlled such that the backup hydraulic pump is operated by the controller in the case of a loss or degradation in the function of the first and second aircraft central hydraulic power sources. Also, the controller is configured to control the backup hydraulic pump such that the backup hydraulic pump is also operated during a normal operation if the high output condition is met. Accordingly, the pressure oil having a high pressure is supplied to the first actuator from the backup hydraulic pump whose maximum discharge pressure is set to be greater than those of the first and second aircraft central hydraulic pumps, and therefore a high drive moment is output from the first actuator to the control surface. Consequently, the backup hydraulic pump can also serve as the mechanism for providing a high output during a normal operation as well. That is, even in the case where a high drive moment is required because the aerodynamic drag is large due to flight conditions such as a high flying speed, a high drive moment can be output to the control surface from the first actuator having a high output and a reduced size, which is installed inside the wing.

It should be appreciated that the above and other objects, features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. It should be appreciated that an embodiment of the present invention can be widely applied as an aircraft actuator hydraulic system that includes hydraulically operated actuators for driving a control surface of an aircraft and that supplies pressure oil to the actuators.

Figure 1:
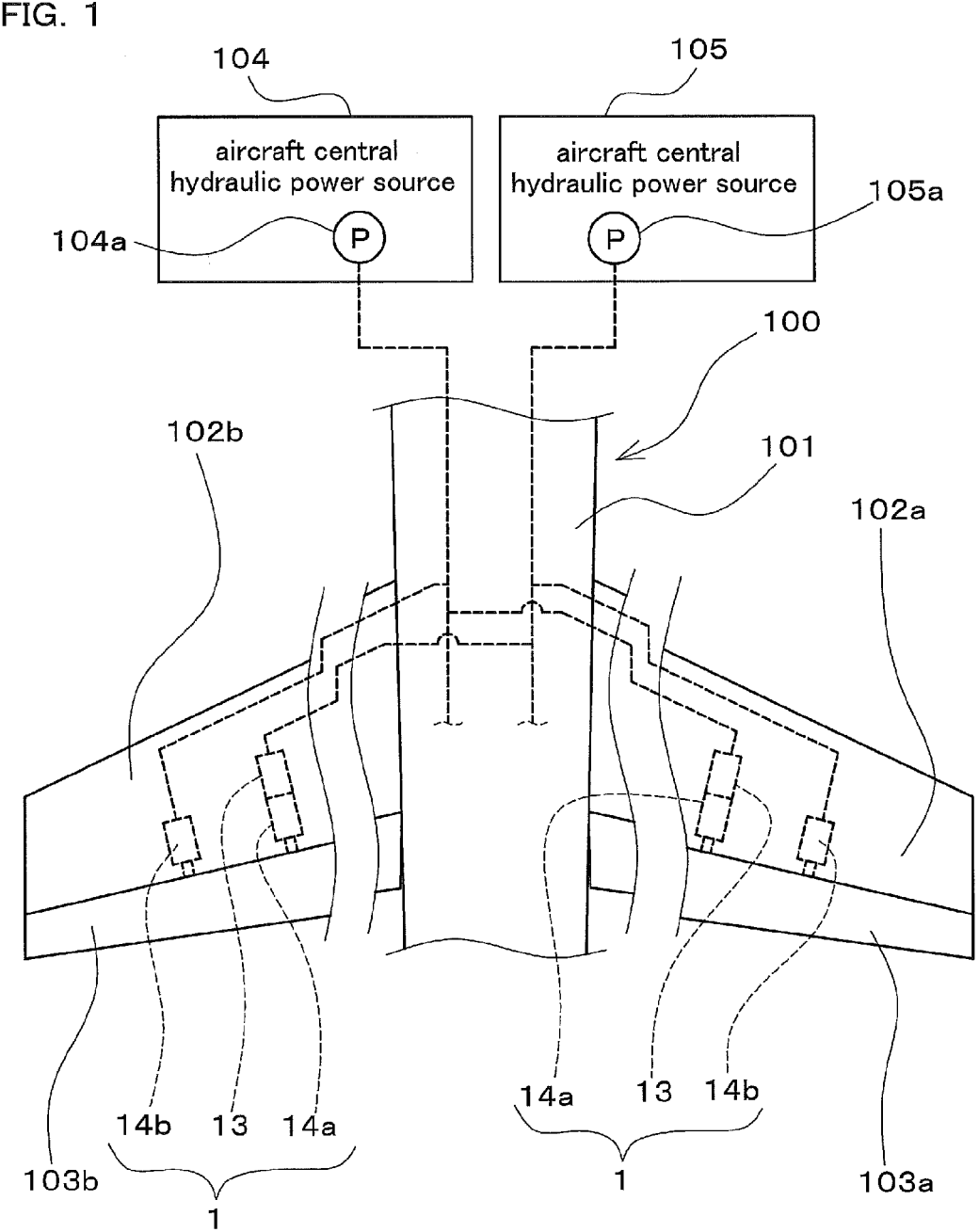
FIG. 1 is a diagram schematically showing part of an aircraft to which an aircraft actuator hydraulic system according to an embodiment of the present invention is applied.

FIG. 1 is a diagram schematically showing part of an aircraft 100 to which an aircraft actuator hydraulic system 1 (hereinafter, also simply referred to as a "hydraulic system 1") according to an embodiment of the present invention is applied, showing part of a fuselage portion of a body 101 of the aircraft 100 and a pair of main wings (102a, 102b). In FIG. 1, the illustration of the intermediate portions of the main wings (102a, 102b) is omitted.

The main wing 102a is provided with an aileron 103a as a moving surface (flight control surface) constituting a control surface of the aircraft 100. Likewise, the main wing 102b is provided with an aileron 103b as a moving surface (flight control surface) constituting a control surface of the aircraft 100. As illustrated in FIG. 1, the aileron 103a of the main wing 102a is configured to be driven by a plurality of (in this embodiment, two) actuators (14a, 14b). The aileron 103b of the main wing 102b is also configured to be driven by a plurality of (in this embodiment, two) actuators (14a, 14b).

The actuators (14a, 14b) for driving the aileron 103a and a hydraulic apparatus 13 configured to supply pressure oil to one of the actuators, namely, the actuator 14a, are installed inside the main wing 102a. On the other hand, the actuators (14a, 14b) for driving the aileron 103b and a hydraulic apparatus 13 configured to supply pressure oil to one of the actuators, namely, the actuator 14a, are installed inside the main wing 102b.

The hydraulic system 1 according to this embodiment includes the actuator 14a, the actuator 14b, the hydraulic apparatus 13, and a flight controller 12, which will be described below, and so forth. Also, the hydraulic system 1 is provided for each of the ailerons 103a and 103b.

In this embodiment, the actuators (14a, 14b) and the hydraulic apparatuses 13 that are respectively installed in the main wings (102a, 102b) are configured in the same manner, and the hydraulic systems 1 that are provided respectively corresponding to the ailerons (103a, 103b) are also configured in the same manner. Therefore, in the following description, the hydraulic system 1 including the actuators (14a, 14b) and the hydraulic apparatus 13 that are installed in one of the main wings, namely, the main wing 102a, will be described. The description of the hydraulic system 1 including the actuators (14a, 14b) and the hydraulic apparatus 13 installed in the other of the main wings, namely, the main wing 102b, is omitted.

Figure 2:
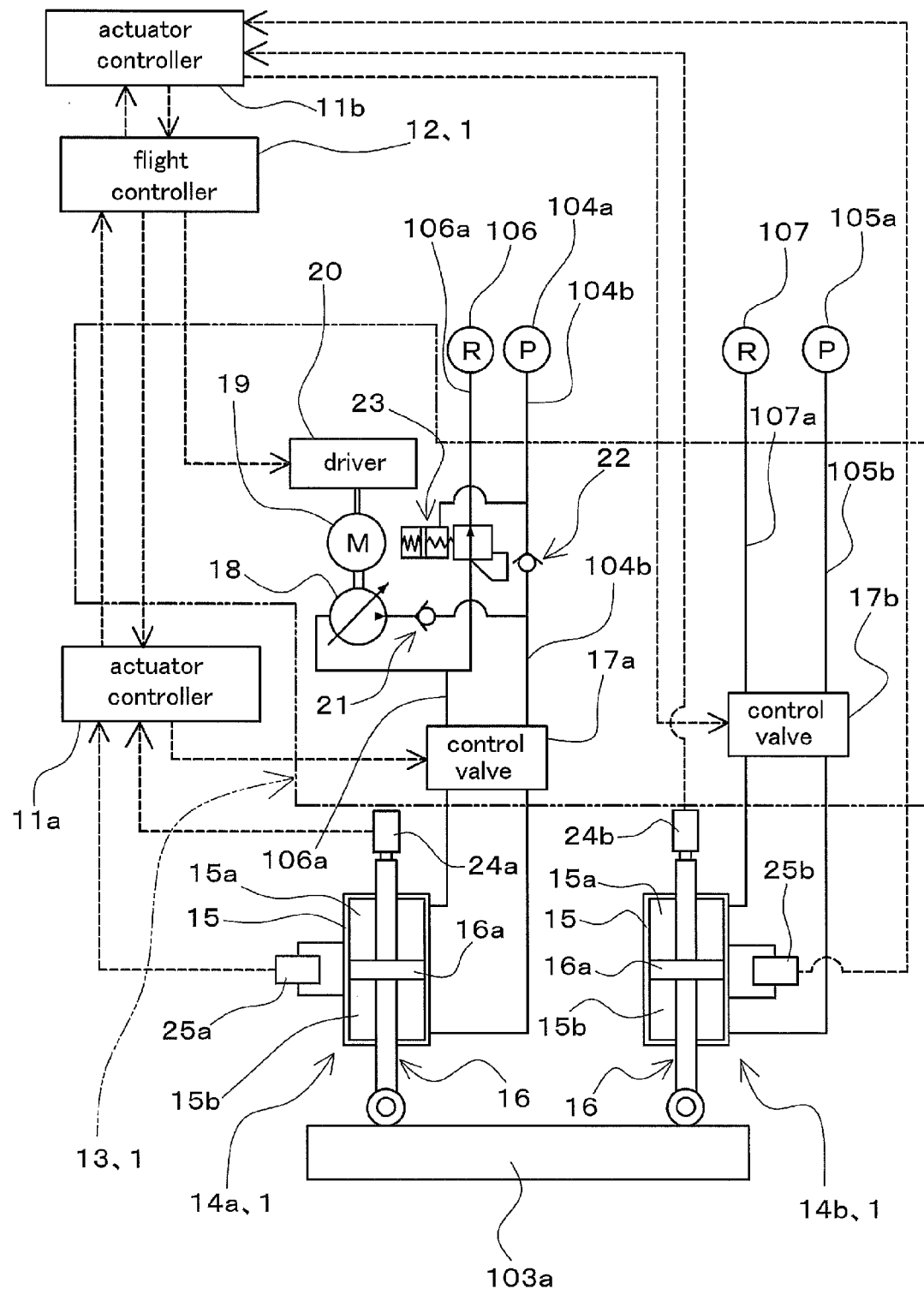
FIG. 2 is a hydraulic circuit diagram schematically showing a hydraulic circuit including the hydraulic system shown in FIG. 1.

FIG. 2 is a hydraulic circuit diagram schematically showing a hydraulic circuit including the hydraulic system 1 corresponding to the aileron 103a. As shown in FIG. 2, each of the actuators (14a, 14b) is coupled to the aileron 103a and configured as a cylinder mechanism that can independently drive the aileron 103a.

Each of the actuators (14a, 14b) includes, for example, a cylinder 15, a rod 16 provided with a piston 16a, and so forth, with the interior of the cylinder 15 divided into two oil chambers (15a, 15b) by the piston 16a. Each of the oil chambers (15a, 15b) in the cylinder 15 of the actuator 14a is configured to be in communication with a first aircraft central hydraulic power source 104, which will be described below, and a reservoir circuit 106 via a control valve 17a included in the hydraulic apparatus 13, which will be described below. On the other hand, each of the oil chambers (15a, 15b) in the cylinder 15 of the actuator 14b is configured to be in communication with an aircraft central hydraulic power source 105, which will be described below, and a reservoir circuit 107 via a control valve 17b.

The actuator 14a is provided with a position sensor 24a for detecting the position of the rod 16 with respect to the cylinder 15. The actuator 14a is further provided with a differential pressure sensor 25a for detecting a differential pressure between the pair of oil chambers (15a, 15b), that is, a difference between the pressure of the pressure oil in the oil chamber 15a and the pressure of the pressure oil in the oil chamber 15b. Note that the differential pressure between the pair of oil chambers (15a, 15b) of the actuator 14a may be detected, for example, as a difference obtained by subtracting the pressure value of the pressure oil in the oil chamber 15b from the pressure value of the pressure oil in the oil chamber 15a.

The actuator 14b is provided with a position sensor 24b for detecting the position of the rod 16 with respect to the cylinder 15. The actuator 14b is further provided with a differential pressure sensor 25b for detecting a differential pressure between the pair of oil chambers (15a, 15b), that is, a difference between the pressure of the pressure oil in the oil chamber 15a and the pressure of the pressure oil in the oil chamber 15b. Note that the differential pressure between the pair of oil chambers (15a, 15b) of the actuator 14b is detected in the same direction as in the case of the actuator 14a. That is, the differential pressure between the pair of oil chambers (15a, 15b) of the actuator 14b may be detected, for example, as a difference obtained by subtracting the pressure value of the pressure oil in the oil chamber 15b from the pressure value of the pressure oil in the oil chamber 15a, as in the case of the actuator 14a.

The aircraft central hydraulic power source 104 shown in FIG. 1 includes an aircraft central hydraulic pump 104a that supplies pressure oil, an oil cooler (not shown) that includes a heat exchanger for cooling the oil passing therethrough and that cools the pressure oil supplied from the aircraft central hydraulic pump 104a, and so forth. The aircraft central hydraulic power source 104 is installed on the body 101 side (inside the body 101). Also, the hydraulic system 1 corresponding to the aircraft central hydraulic power source 104 constitutes a first aircraft central hydraulic power source serving as a first hydraulic power source and the aircraft central hydraulic pump 104a constitutes a first aircraft central hydraulic pump.

As with the aircraft central hydraulic power source 104, the aircraft central hydraulic power source 105 shown in FIG. 1 also includes an aircraft central hydraulic pump 105a that supplies pressure oil, an oil cooler (not shown) that includes a heat exchanger for cooling the oil passing therethrough and that cools the pressure oil supplied from the aircraft central hydraulic pump 105a, and so forth, as with the first aircraft central hydraulic power source 104. The aircraft central hydraulic power source 105 is installed on the body 101 side (inside the body 101). For the hydraulic system 1 corresponding to the aileron 103a, the aircraft central hydraulic power source 105 constitutes a second aircraft central hydraulic power source serving as a second hydraulic power source and the aircraft central hydraulic pump 105a constitutes a second aircraft central hydraulic pump. Note that the aircraft central hydraulic power source 104 and the aircraft central hydraulic power source 105 are provided as systems that are independent of each other.

By supplying the pressure oil from the aircraft central hydraulic power sources (104, 105), the actuators (14a, 14b) for driving the ailerons (103a, 103b) and actuators (not shown) for driving control surfaces other than the ailerons (103a, 103b) are operated. Further, the aircraft central hydraulic power source 104 is connected so as to be able to supply pressure oil to the actuator 14a installed in one of the main wings 102a and the actuator 14b installed in the other main wing 102b. On the other hand, the aircraft central hydraulic power source 105 is connected so as to be able to supply pressure oil to the actuator 14b installed in one of the main wings 102a and the actuator 14a installed in the other main wing 102b.

The reservoir circuit 106 shown in FIG. 2 includes a tank (not shown) into which oil (hydraulic fluid) that is supplied as pressure oil and is thereafter discharged from the actuator 14a corresponding to the aileron 103a and the actuator 14b corresponding to the aileron 103b flows back, and the reservoir circuit 106 is configured to be in communication with the aircraft central hydraulic power source 104. The reservoir circuit 107, which is configured as a system independent of the reservoir circuit 106, includes a tank (not shown) into which oil (hydraulic fluid) that is supplied as pressure oil and is thereafter discharged from the actuator 14a corresponding to the aileron 103b and the actuator 14b corresponding to the aileron 103a flows back, and the reservoir circuit 107 is configured to be in communication with the aircraft central hydraulic power source 105, which is configured as a system independent of the aircraft central hydraulic power source 104.

As described above, the reservoir circuit 106 is connected with the actuator 14a installed in one of the main wings 102a and the actuator 14b installed in the other main wing 102b, and is also connected with the aircraft central hydraulic power source 104. Consequently, the pressure of the oil that has returned to the reservoir circuit 106 is raised by the aircraft central hydraulic power source 104 and the oil is supplied to the actuators (14a, 14b). On the other hand, the reservoir circuit 107 is connected with the actuator 14b installed in one of the main wings 102a and the actuator 14a installed in the other main wing 102b, and is also connected with the aircraft central hydraulic power source 105. Consequently, the pressure of the oil that has returned to the reservoir circuit 107 is raised by the aircraft central hydraulic power source 105 and the oil is supplied to the actuators (14a, 14b).

Note that, in this embodiment, the actuators (14a, 14b) are provided as hydraulically operated actuators for driving the control surfaces configured as the ailerons (103a, 103b). In other words, an embodiment is shown in which the hydraulic systems 1 each including the actuators (14a, 14b) are provided corresponding to the ailerons (103a, 103b). However, this need not be the case, and the hydraulic systems 1 may be used as hydraulic systems that include actuators for driving control surfaces other than ailerons, such as elevators, and that supply pressure oil to these actuators.

Further, in the hydraulic system 1 corresponding to the aileron 103a in this embodiment, the actuator 14a constitutes a first actuator of this embodiment that is operated by supply of pressure oil from the aircraft central hydraulic power source 104 (first aircraft central hydraulic power source) and that drives the aileron 103a serving as the control surface. Further, in the hydraulic system 1 corresponding to the aileron 103a, the actuator 14b constitutes a second actuator of this embodiment that is operated by supply of pressure oil from the aircraft central hydraulic power source 105 (second aircraft central hydraulic power source) and that drives the aileron 103a, which is the same control surface as the above control surface.

In the following description, the hydraulic system 1 corresponding to the aileron 103a will be described. Accordingly, the aircraft central hydraulic power source 104 is also referred to as the first aircraft central hydraulic power source 104, the aircraft central hydraulic power source 105 is also referred to as the second aircraft central hydraulic power source 105, the aircraft central hydraulic pump 104a is also referred to as the first aircraft central hydraulic pump 104a, and the aircraft central hydraulic pump 105a is also referred to as the second aircraft central hydraulic pump 105a. Further, the actuator 14a is also referred to as the first actuator 14a and the actuator 14b is also referred to as the second actuator 14b.

The hydraulic apparatus 13 of the hydraulic system 1 corresponding to the aileron 103a is configured to supply pressure oil to the first actuator 14a. Also, as shown in FIG. 2, the hydraulic apparatus 13 includes the control valves (17a, 17b), a backup hydraulic pump 18, an electric motor 19, a driver 20, a backup-side check valve 21, an aircraft central hydraulic power source-side check valve 22, a relief valve 23, and so forth.

The control valve 17a is provided as a valve mechanism that switches the state of connection of the oil chambers (15a, 15b) of the first actuator 14a with a supply passage 104b that is in communication with the first aircraft central hydraulic power source 104 and an exhaust passage 106a that is in communication with the reservoir circuit 106. The control valve 17a is provided, for example, as an electrohydraulic servo valve (EHSV), is configured such that the position of its spool (not shown) can be proportionally switched, and is driven in accordance with a command signal from an actuator controller 11a that controls the operation of the first actuator 14a.

On the other hand, the control valve 17b is provided as a valve mechanism that switches the state of connection of the oil chambers (15a, 15b) of the actuator 14b with a supply passage 105b that is in communication with the second aircraft central hydraulic power source 105 and an exhaust passage 107a that is in communication with the reservoir circuit 107. Also, the control valve 17b is configured in the same manner as the control valve 17a, is provided, for example, as an electrohydraulic servo valve (EHSV), and is configured such that the position of its spool (not shown) can be proportionally switched. Further, the control valve 17b is driven in accordance with a command signal from an actuator controller 11b that controls the operation of the actuator 14b.

Further, the control valve 17a is switched in accordance with a command signal from the actuator controller 11a, and thereby the pressure oil is supplied from the supply passage 104b to one of the oil chambers (15a, 15b) and the oil is discharged from the other of the oil chambers (15a, 15b) to the exhaust passage 106a. Consequently, the rod 16 is displaced relative to the cylinder 15, thus driving the aileron 103a. Although not shown, a mode switching valve that switches the state (mode) of communication between the oil chambers (15a, 15b) is provided between the control valve 17a and the first actuator 14a. Note that the operation of the control valve 17b is the same as that of the control valve 17a described above, and therefore the description thereof is omitted.

The backup hydraulic pump 18 is installed inside the main wing 102a and is configured as a variable capacity hydraulic pump including a swash plate. The suction side of the backup hydraulic pump 18 is connected in communication with the exhaust passage 106a, and its discharge side is connected in communication with the supply passage 104b via the backup-side check valve 21 so as to be able to supply pressure oil to the supply passage 104b.

Further, the backup hydraulic pump 18 is provided as a hydraulic pump that can supply pressure oil to the first actuator 14a at the occurrence of a loss or degradation in the function (pressure oil supply function) of at least one of the first aircraft central hydraulic power source 104 and the second aircraft central hydraulic power source 105. That is, the backup hydraulic pump 18 is configured to be able to supply the pressure oil to the first actuator 14a at the occurrence of a loss or degradation in the function of the first aircraft central hydraulic power source 104 due to a failure of the first aircraft central hydraulic pump 104a, an oil leakage, or the like in the first aircraft central hydraulic power source 104. Also, the backup hydraulic pump 18 is configured to be able to supply the pressure oil to the first actuator 14a at the occurrence of a loss or degradation in the function of the second aircraft central hydraulic power source 105 due to a failure of the second aircraft central hydraulic pump 105a, an oil leakage, or the like in the second aircraft central hydraulic power source 105.

Also, the backup hydraulic pump 18 is set such that its maximum discharge pressure is greater than the maximum discharge pressures of the first aircraft central hydraulic pump 104a of the first aircraft central hydraulic power source 104 and the second aircraft central hydraulic pump 105a of the second aircraft central hydraulic power source 105. For example, the maximum discharge pressures of the first aircraft central hydraulic pump 104a and the second aircraft central hydraulic pump 105a are set to 3000 psi (20.7 MPa), and the maximum discharge pressure of the backup hydraulic pump 18 is set to 5000 psi (34.5 MPa).

Note that the backup-side check valve 21 described above is provided as a check valve that permits an oil flow in a direction from the backup hydraulic pump 18 to the first actuator 14a and prevents an oil flow in the opposite direction. Further, the aircraft central hydraulic power source-side check valve 22 is provided on the discharge side of the backup hydraulic pump 18 in the supply passage 104b and upstream (on the first aircraft central hydraulic pump 104a side) of a location of the supply passage 104b where the downstream side of the backup-side check valve 21 is connected. The aircraft central hydraulic power source-side check valve 22 is provided as a check valve that permits an oil flow in a direction from the first aircraft central hydraulic pump 104a to the first actuator 14a and prevents an oil flow in the opposite direction.

Further, the relief valve 23 that discharges pressure oil into the reservoir circuit 106 when the pressure of the oil discharged from the first actuator 14a rises is provided downstream (on the reservoir circuit 106 side) of a location of the exhaust passage 106a where the suction side of the backup hydraulic pump 18 is connected. Also, the relief valve 23 is provided with a pilot pressure chamber that is in communication with the supply passage 104b and in which a spring is disposed. When the pressure of the pressure oil supplied from the supply passage 104b decreases below a predetermined pressure value, the pressure of the pressure oil being supplied as a pilot pressure oil to the pilot pressure chamber (pilot pressure) from the supply passage 104b also decreases below a predetermined pressure value, as a result of which the exhaust passage 106a is blocked by the relief valve 23. In this way, in the case of a loss or degradation in the function of the first aircraft central hydraulic power source 104, it is possible, with the hydraulic apparatus 13, to raise the pressure of the oil discharged from the first actuator 14a by the backup hydraulic pump 18 by providing the above-described check valves (21, 22) and relief valve 23, without returning the oil to the reservoir circuit 106, and the pressure oil with an increased pressure can be supplied to the actuator 14a.

The electric motor 19 is installed inside the main wing 102a, together with the backup hydraulic pump 18. Also, the electric motor 19 is coupled to the backup hydraulic pump 18 via a coupling or the like, and is configured to drive the backup hydraulic pump 18. The operational status of the electric motor 19 is controlled via the driver 20, in accordance with a command signal from the flight controller 12, which will be described below. Note that the driver 20 is provided as a circuit board or the like that drives the electric motor 19 by controlling the electric power supplied to the electric motor 19 and the running speed (rotation speed) of the electric motor 19 in accordance with a command signal from the flight controller 12.

Figure 3:
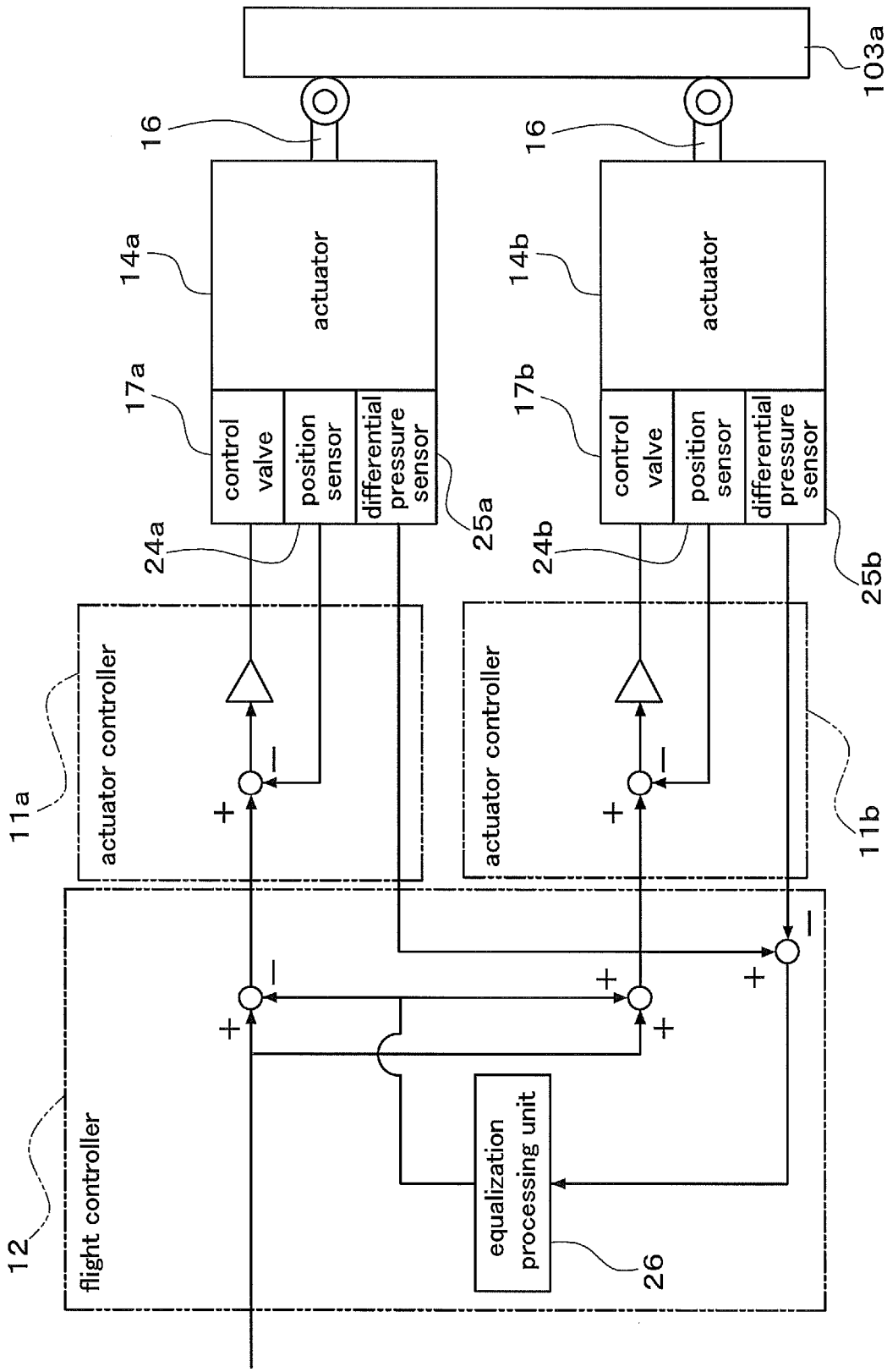
FIG. 3 is a block diagram showing a control structure of the aircraft actuator hydraulic system shown in FIG. 2.

Next, the flight controller 12 of the hydraulic system 1 will be described. FIG. 3 is a block diagram showing the control structure of the hydraulic system 1. The flight controller 12 shown in FIGS. 2 and 3 includes, for example, a central processing unit (CPU), a memory, an interface, and so forth, which are not shown.

The flight controller 12 is provided as a superordinate computer of the actuator controller 11a and the actuator controller 11b, and is configured as a computer that commands operation of the aileron 103a. That is, the flight controller 12 is configured to generate a command signal for commanding operation of the aileron 103a in accordance with a manipulation signal or the like that is generated by the manipulation by a pilot (not shown) and transmit the command signal to the actuator controllers (11a, 11b).

When a command signal for commanding operation of the aileron 103a is transmitted to the actuator controllers (11a, 11b), the actuator controller 11a controls the first actuator 14a in accordance with the above-mentioned command signal and the actuator controller 11b controls the second actuator 14b in accordance with the above-mentioned command signal. As shown in FIG. 3, the actuator controller 11a is configured to perform a feedback control for the position of the rod 16 of the first actuator 14a by adjusting the spool position of the control valve 17a at this time based on a result of a position detection of the rod 16 by the position sensor 24a. Likewise, the actuator controller 11b is configured to perform a feedback control for the position of the rod 16 of the second actuator 14b by adjusting the spool position of the control valve 17b based on a result of a position detection of the rod 16 by the position sensor 24b. Consequently, the operation of the aileron 103a is controlled.

The actuator controllers (11a, 11b) will now be described briefly. The actuator controllers (11a, 11b) that control the actuators (14a, 14b) for driving the aileron 103a may be installed, for example, as controllers of a centralized control system, or controllers of a distributed processing system. In the case of the centralized control system, the actuator controller 11a and the actuator controller 11b are installed in a single casing (not shown) installed on the body 101 side, and the system is configured such that the actuator controller 11a controls the actuator 14a and the actuator controller 11b controls the actuator 14b.

In the case of the distributed processing system, the actuator controller 11a is installed in a casing (not shown) mounted to the actuator 14a and the actuator controller 11b is installed in a casing (not shown) mounted to the actuator 14b. Also, the system is configured such that the actuator controller 11a controls the actuator 14a and the actuator controller 11b controls the actuator 14b.

Further, the flight controller 12 is connected to a pressure sensor (not shown) for detecting the discharge pressure of the first aircraft central hydraulic pump 104a or the pressure of the pressure oil flowing through the supply passage 104b and a pressure sensor (not shown) for detecting the discharge pressure of the second aircraft central hydraulic pump 105a or the pressure of the pressure oil flowing through the supply passage 105b. Accordingly, the flight controller 12 is configured to receive pressure detection signals detected by the above-described pressure sensors and detect a loss or degradation in the function of the first aircraft central hydraulic power source 104 and a loss or degradation in the function of the second aircraft central hydraulic power source 105 based on those pressure detection signals.

For example, the flight controller 12 is configured to detect a loss or degradation in the function of the first aircraft central hydraulic power source 104 according to the timing at which the pressure value of the pressure detection signal from the pressure sensor installed in the first aircraft central hydraulic pump 104a or the like becomes equal to or less than a predetermined pressure value. Also, the flight controller 12 is configured to detect a loss or degradation in the function of the second aircraft central hydraulic power source 105 according to the timing at which the pressure value of the pressure detection signal from the pressure sensor installed in the second aircraft central hydraulic pump 105a or the like becomes equal to or less than a predetermined pressure value.

Further, the flight controller 12 is configured to also be able to transmit a command signal to the driver 20. When a loss or degradation in the function of at least one of the first aircraft central hydraulic power source 104 and the second aircraft central hydraulic power source 105 is detected by the flight controller 12, the driver 20 drives the electric motor 19 in accordance with a command signal from the flight controller 12. Consequently, operation of the electric motor 19 is started and the backup hydraulic pump 18, which can supply pressure oil having a higher pressure than the first and second aircraft central hydraulic pumps (104a, 105a), is operated, and thereby the pressure oil is supplied to the actuator 104a as described above. Thus, the flight controller 12 constitutes a controller of this embodiment that controls the backup hydraulic pump 18 such that the backup hydraulic pump 18 is operated at the occurrence of a loss or degradation in the function of at least one of the first aircraft central hydraulic power source 104 and the second aircraft central hydraulic power source 105.

Further, the flight controller 12 is configured to control the backup hydraulic pump 18 such that the backup hydraulic pump 18 is also operated during a normal operation in which a loss or degradation in the function has not occurred in the first aircraft central hydraulic power source 104 or the second aircraft central hydraulic power source 105 if a predetermined condition is met. For the flight controller 12, the predetermined condition is set as a high output condition where the moment required to drive the aileron 103a exceeds predetermined drive moments that can be generated by the first actuator 14a operated with the pressure oil from the first aircraft central hydraulic power source 104 and the second actuator 14b operated with the pressure oil from the second aircraft central hydraulic power source 105.

Note that the magnitude of the moment resulting from the aerodynamic drag exerted on the aileron 103a is approximately proportional to the air density in the vicinity of the aileron 103a, the square of the flying speed of the aircraft 100, and the rudder angle, which is the angle of inclination of the aileron 103a to the main wing 102a. On the other hand, the drive moments that are output from the actuators (14a, 14b) to drive the aileron 103a are proportional to the product of the pressure of the pressure oil supplied to the actuators (14a, 14b), the pressure receiving area of the piston 16a, and the horn arm length (the length of the moment arm), which is the distance between the position at which the end of the rod 16 is coupled to the aileron 103a and the position of the fulcrum of the aileron 103a.

In order to maintain a state in which the aileron 103a can be driven, a moment exceeding a moment generated by the aerodynamic drag exerted on the aileron 103a needs to be secured as a drive moment for driving the aileron 103a. Accordingly, the magnitude of the moment generated by the aerodynamic drag exerted on the aileron 103a is calculated based on signals from various sensors, and when the high output condition is met where the moment generated by the aerodynamic drag exceeds the drive moments that can be generated by the actuators (14a, 14b) operated with the pressure oil from the aircraft central hydraulic power sources (104, 105), for example, when the flying speed is high, the flight controller 12 controls the backup hydraulic pump 18 via the driver 20 and the electric motor 19, so as to operate the backup hydraulic pump 18 in addition to operating the first and second aircraft central hydraulic pumps (104a, 105a).

Note that, as described above, in the case of operating the backup hydraulic pump 18 in addition to operating the first and second aircraft central hydraulic pumps (104a, 105a) and the case of operating the second aircraft central hydraulic pump 105a and the backup hydraulic pump 18 due to the occurrence of a loss or degradation in the function of the first aircraft central hydraulic power source 104, the pressure oil supplied to the first actuator 14a and the pressure oil supplied to the second actuator 14b have different pressures. That is, the pressure oil having at least a predetermined pressure (for example, at least 20.7 MPa) is supplied to the second actuator 14b from the second aircraft central hydraulic pump 105a, and the pressure oil having at least a predetermined high pressure (for example, at least 34.5 MPa) is supplied to the first actuator 14a from the backup hydraulic pump 18, which has a higher maximum discharge pressure than the second aircraft central hydraulic pump 105a.

In contrast to the above, the flight controller 12 is provided with a configuration for preventing the occurrence of a force fight in which the first actuator 14a and the second actuator 14b are biased in opposite directions due to displacement between the position of the rod 16 of the first actuator 14a and the position of the rod 16 of the second actuator 14b. As shown in FIG. 3, the flight controller 12 is provided with an equalization processing unit 26 that adjusts command signals for controlling the operation of the first and second actuators (14a, 14b) via the actuator controllers (11a, 11b) as the configuration for preventing the force fight.

The equalization processing unit 26 is provided as the CPU in the flight controller 12 or another electronic circuit provided in the flight controller 12. The equalization processing unit 26 is configured to adjust command signals to the first and second actuators (14a, 14b) so as to equalize the position of the rod 16 of the first actuator 14a and the position of the rod 16 of the second actuator 14b (so as to correct any positional offset and cause the positions to coincide).

Further, the flight controller 12 is configured such that a differential pressure signal detected by the differential pressure sensor 25a of the first actuator 14a is received via the actuator controller 11a and a differential pressure signal detected by the differential pressure sensor 25b of second actuator 14b is received via the actuator controller 11b. Also, the flight controller 12 is configured such that a difference obtained by subtracting the value of the differential pressure signal of the differential pressure sensor 25b of the second actuator 14b from the value of the differential pressure signal of the differential pressure sensor 25a of the first actuator 14a is computed, and that the equalization processing unit 26 adjusts command signals to the first actuator 14a and the second actuator 14b based on the computation result.

Note that when displacement starts to occur between the position of the rod 16 of the first actuator 14a and the position of the rod 16 of the second actuator 14b, the value of the difference, which is either positive or negative, between differential pressure signals of the differential pressure sensor 25a and the differential pressure sensor 25b increases in size. Then, the equalization processing unit 26 adjusts command signals to the first actuator 14a and the second actuator 14b according to the sign and the size of the value of difference between the differential pressure signals.

Note that the flight controller 12 may be configured to activate the backup hydraulic pump 18 also at the timing at which the aircraft 100 is placed in a landing attitude, in addition to the timing at which a loss or degradation occurred in the function of at least one of the first aircraft central hydraulic power source 104 and the second aircraft central hydraulic power source 105 and the timing at which the above-described high output condition is met. In this case, it is possible to ensure a safe flight even if a sudden loss or degradation occurs in the function of the first and second aircraft central hydraulic power sources (104, 105) in the landing stage since the backup hydraulic pump 18 is already in operation.

Next, the operation of the hydraulic system 1 will be described. In a state of a normal operation in which a loss or degradation in the function of the first aircraft central hydraulic power source 104 or the second aircraft central hydraulic power source 105 has not occurred and in which the above-described high output condition is not met, the backup hydraulic pump 18 is not operated. In this state, the pressure oil from the first aircraft central hydraulic power source 104 is supplied to one of the oil chambers (15a, 15b) of the first actuator 14a via the control valve 17a. The oil is discharged from the other of the oil chambers (15a, 15b) and is returned to the reservoir circuit 106 via the control valve 17a. In the same manner, the pressure oil from the second aircraft central hydraulic power source 105 is supplied to the second actuator 14b, and the oil is discharged from the second actuator 14b and is returned to the reservoir circuit.

Further, switching between the oil chambers (15a, 15b) to which the pressure oil is supplied and from which the oil is discharged is performed by switching the state of connection of the control valve 17a in accordance with a command signal from the actuator controller 11a. Likewise, switching between the oil chambers (15a, 15b) to which the pressure oil is supplied and from which the oil is discharged is performed by switching the state of connection of the control valve 17b in accordance with a command signal from the actuator controller 11b. Consequently, the first actuator 14a and the second actuator 14b are operated to drive the aileron 103a.

When the above-described high output condition is met during a normal operation in which a loss or degradation in the function of the first aircraft central hydraulic power source 104 or the second aircraft central hydraulic power source 105 has not occurred, operation of the electric motor 19 is started in accordance with a command signal from the flight controller 12, thus activating the backup hydraulic pump 18 and starting its operation. Then, the pressure oil from the backup hydraulic pump 18 is supplied to one of the oil chambers (15a, 15b) of the first actuator 14a via the control valve 17a. The oil is discharged from the other of the oil chambers (15a, 15b) and is then sucked in by the backup hydraulic pump 18 via the control valve 17a, and thus the pressure of the oil is raised.

In this state, the pressure oil from the second aircraft central hydraulic pump 105a is supplied to the second actuator 14b, and the pressure oil from the backup hydraulic pump 18, which discharges the pressure oil having a higher pressure than the second aircraft central hydraulic pump 105a, is supplied to the first actuator 14a. In response to this, the equalization processing unit 26 of the flight controller 12 adjusts command signals to the first and second actuators (14a, 14b) so as to equalize the position of the rod 16 of the first actuator 14a and the position of the rod 16 of the second actuator 14b, as described above. Then, in a state in which the occurrence of a force fight between the first and second actuators (14a, 14b) is prevented, the state of connection of the control valve 17a is switched in accordance with a command signal from the actuator controller 11a and the state of connection of the control valve 17b is switched in accordance with a command signal from the actuator controller 11b. Consequently, the first and second actuators (14a, 14b) are operated in synchronization, and thereby the aileron 103a is driven with a high drive moment.

On the other hand, when a loss or degradation in the function of at least one of the first aircraft central hydraulic power source 104 and the second aircraft central hydraulic power source 105 occurs, operation of the electric motor 19 is started in accordance with a command signal from the flight controller 12, thus activating the backup hydraulic pump 18 and starting its operation. Then, the pressure oil from the backup hydraulic pump 18 is supplied to one of the oil chambers (15a, 15b) of the first actuator 14a via the control valve 17a. The oil is discharged from the other of the oil chambers (15a, 15b) and is then sucked in by the backup hydraulic pump 18 via the control valve 17a, and thus the pressure of the oil is raised. Further, switching between the oil chambers (15a, 15b) to which pressure oil is supplied and from which the oil is discharged is performed by switching the state of connection of the control valve 17a in accordance with a command signal from the actuator controller 11a, as a result of which the first actuator 14a is operated to drive the aileron 103a.

As described above, according to this embodiment, the hydraulic system 1 is provided as a hydraulic system including a plurality of actuators, namely, the first and second actuators (14a, 14b) for driving the same control surface, namely, the aileron 103a. Also, with the hydraulic system 1, even if a loss or degradation occurs in the function of the first and second aircraft central hydraulic power sources (104, 105), the aileron 103a can be driven by a single actuator, namely, the first actuator 14a to which the pressure oil is supplied from the backup hydraulic pump 18 installed inside the main wing 102a, and therefore it is possible to ensure high reliability.

Further, the backup hydraulic pump 18 is set such that its maximum discharge pressure is greater than the maximum discharge pressures of the first aircraft central hydraulic pump 104a and the second aircraft central hydraulic pump 105a. Accordingly, the backup hydraulic pump 18, rather than the first and second aircraft central hydraulic pumps (104a, 105a), can be adapted to high pressure, thus making it possible to achieve a high output in the first actuator 14a even with a small pressure receiving area. Accordingly, it is possible to reduce the size of the high-output first actuator 14a.

Note that the first actuator 14a is configured such that the aileron 103a can be driven by a single actuator, namely, the actuator 14a with the pressure oil supplied from the backup hydraulic pump 18. Therefore, the second actuator 14b does not need to be adapted to a high output in the same manner as the first actuator 14a, and therefore its size can be reduced. Further, since the backup hydraulic pump 18 installed inside the main wing 102a can be adapted to high pressure without adapting the first and second aircraft central hydraulic pumps (104a, 105a) to high pressure, it is not necessary to adapt the entire hydraulic system, from the aircraft central hydraulic power sources (104, 105) to the actuators (14a, 14b), to high pressure. Accordingly, it is possible to realize a size reduction for the high-output first actuator 14a at a low cost. Further, since it is possible to realize a size reduction for the high-output first actuator 14a and a size reduction for the second actuator 14b, it is possible to install the first and second actuators (14a, 14b) inside the main wing 102a having a reduced thickness.

Therefore, according to this embodiment, in an aircraft actuator hydraulic system 1 including a plurality of actuators (14a, 14b) for driving the same control surface, namely, the aileron 103a, the aileron 103a can be driven by a single actuator, namely, the actuator 14a, even in the case of a loss or degradation in the function of the aircraft central hydraulic power sources (104, 105), and it is possible to realize a size reduction for the high-output actuator 14a at a low cost and install the actuators (14a, 14b) inside the main wing 102a having a reduced thickness.

Further, with the hydraulic system 1, the backup hydraulic pump 18 is controlled by the flight controller 12 such that the backup hydraulic pump 18 is operated in the case of a loss or degradation in the function of the first and second aircraft central hydraulic power sources (104, 105). Also, the flight controller 12 is configured to control the backup hydraulic pump 18 such that the backup hydraulic pump 18 is also operated during a normal operation if the high output condition is met. Accordingly, the pressure oil having a high pressure is supplied to the first actuator 14a from the backup hydraulic pump 18 whose maximum discharge pressure is set to be greater than those of the first and second aircraft central hydraulic pumps (104a, 105a), and therefore a high drive moment is output from the first actuator 14a to the aileron 103a. Consequently, the backup hydraulic pump 18 can also serve as the mechanism for providing a high output during a normal operation as well. That is, even in the case where a high drive moment is required because the aerodynamic drag is large due to flight conditions such as a high flying speed, a high drive moment can be output to the aileron 103a from the first actuator 14a having a high output and a reduced size, which is installed inside the main wing 102a.

Since the hydraulic system 1 corresponding to the aileron 103a is described in the above embodiment, the aircraft central hydraulic power source 104 constitutes the first aircraft central hydraulic power source 104 and the aircraft central hydraulic power source 105 constitutes the second aircraft central hydraulic power source 105; however, these combinations are reversed for the hydraulic system 1 corresponding to the aileron 103b. That is, for the hydraulic system 1 corresponding to the aileron 103b, the aircraft central hydraulic power source 104 constitutes the second aircraft central hydraulic power source 104 and the aircraft central hydraulic power source 105 constitutes the first aircraft central hydraulic power source 105.

Although an embodiment of the present invention has been described thus far, the present invention is not limited to the above-described embodiment, and various modifications may be made within the scope recited in the claims. For example, it is possible to implement an aircraft actuator hydraulic system that includes an actuator for driving a control surface other than an aileron, such as an elevator, and that supplies pressure oil to that actuator. Further, various modifications can be made to the configuration of the hydraulic circuit that connects the aircraft actuator hydraulic system with the aircraft central hydraulic power sources. Also, the configuration of the controller that controls the operation of the backup hydraulic pump is not limited to that illustrated in the above-described embodiment, and various modifications may be made. Further, although the above embodiment has been described, taking, as an example, actuators that are provided with a differential pressure sensor for detecting a differential pressure between a pair of oil chambers, this need not be the case. For example, in a hydraulic system including actuators each provided with pressure sensors for respectively detecting the pressures of the pressure oil inside a pair of oil chambers, it is possible to adopt a configuration in which the difference between the pressures is detected based on detection signals of the pressure sensors and a control is performed so as to prevent the occurrence of a force fight.

The present invention can be widely applied as an aircraft actuator hydraulic system that includes hydraulically operated actuators for driving a control surface of an aircraft and that supplies pressure oil to the actuators. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft actuator hydraulic system that includes hydraulically operated actuators for driving a control surface of an aircraft having a body and wings and that supplies pressure oil to the actuators, the system comprising:
    a first actuator provided as one of the actuators and configured to drive the control surface by being operated by supply of pressure oil from a first aircraft central hydraulic power source including a first aircraft central hydraulic pump;
    a second actuator provided as another one of the actuators and configured to drive the control surface by being operated by supply of pressure oil from a second aircraft central hydraulic power source including a second aircraft central hydraulic pump; wherein the first aircraft central hydraulic pump and the second aircraft central hydraulic pump are disposed in the body of the aircraft; and
    a backup hydraulic pump installed inside a wing of the aircraft and to supply pressure oil to the first actuator when a loss or degradation in a function of at least one of the first aircraft central hydraulic power source and the second aircraft central hydraulic power source occurs,
    wherein a maximum discharge pressure of the backup hydraulic pump is unadjustably set to be greater than maximum discharge pressures of the first aircraft central hydraulic pump and the second aircraft central hydraulic pump.

2. The aircraft actuator hydraulic system according to claim 1,
    further comprising a controller adapted to control the backup hydraulic pump such that the backup hydraulic pump is operated when a loss or degradation in a function of at least one of the first aircraft central hydraulic power source and the second aircraft central hydraulic power source occurs,
    wherein, during a normal operation in which a loss or degradation in a function of the first aircraft central hydraulic power source or the second aircraft central hydraulic power source has not occurred, the controller controls the backup hydraulic pump such that the backup hydraulic pump is also operated if a high output condition is met, the condition being that a moment required to drive the control surface is greater than predetermined drive moments that can be generated by the first actuator operated with the pressure oil from the first aircraft central hydraulic power source and the second actuator operated with the pressure oil from the second aircraft central hydraulic power source.

* * * * *